United States Patent
Niwa et al.

(10) Patent No.: US 9,068,597 B2
(45) Date of Patent: Jun. 30, 2015

(54) SLIDING MEMBER AND FLUID DYNAMIC PRESSURE BEARING APPARATUS

(71) Applicant: MINEBEA CO., LTD., Kitasaku-gun, Nagano (JP)

(72) Inventors: Shinichi Niwa, Kakegawa (JP); Eiji Fujimoto, Tokyo (JP); Toshiaki Asakawa, Kakegawa (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 298 days.

(21) Appl. No.: 13/712,503

(22) Filed: Dec. 12, 2012

(65) Prior Publication Data

US 2013/0154419 A1 Jun. 20, 2013

(30) Foreign Application Priority Data

Dec. 19, 2011 (JP) ................................. 2011-277468
Oct. 10, 2012 (JP) ................................. 2012-224766

(51) Int. Cl.
| | |
|---|---|
| *F16C 32/06* | (2006.01) |
| *H02K 7/08* | (2006.01) |
| *F16C 17/10* | (2006.01) |
| *F16C 33/04* | (2006.01) |

(52) U.S. Cl.
CPC ......... *F16C 32/0662* (2013.01); *F16C 32/0629* (2013.01); *H02K 7/08* (2013.01); *F16C 2370/12* (2013.01); *F16C 17/107* (2013.01); *F16C 33/043* (2013.01); *F16C 2223/60* (2013.01); *F16C 2206/04* (2013.01); *F16C 2240/64* (2013.01)

(58) Field of Classification Search
CPC ............. F16C 32/0629; F16C 32/0662; F16C 33/043; F16C 17/107; F16C 2370/12; F16C 2240/64; F16C 2223/60; F16C 2206/04; H02K 7/08
USPC ......... 384/100, 107, 121, 123, 129, 276, 297, 384/420, 425, 907
See application file for complete search history.

(56) References Cited

U.S. PATENT DOCUMENTS

| | | | | |
|---|---|---|---|---|
| 6,656,293 | B2 * | 12/2003 | Black et al. ................... | 384/276 |
| 7,462,003 | B2 * | 12/2008 | Middlemiss .................. | 407/119 |
| 2003/0057662 | A1 * | 3/2003 | Miya et al. .................... | 384/297 |
| 2007/0054125 | A1 * | 3/2007 | Akari et al. ................... | 428/408 |
| 2007/0110348 | A1 * | 5/2007 | Obara ........................... | 384/107 |
| 2012/0088701 | A1 * | 4/2012 | Suzuki et al. ................. | 508/109 |

FOREIGN PATENT DOCUMENTS

| | | |
|---|---|---|
| JP | A-2004-010923 | 1/2004 |
| JP | A-2008-081630 | 4/2008 |

* cited by examiner

*Primary Examiner* — James Pilkington
(74) *Attorney, Agent, or Firm* — Oliff PLC

(57) ABSTRACT

There is provided a sliding member including: a substrate; and a protective film provided on the substrate, wherein the protective film is composed only of a metal base layer provided on the substrate, a low-hardness diamond-like carbon layer provided as a single layer on the metal base layer, and a high-hardness diamond-like carbon layer provided as a single layer directly on the low-hardness diamond-like carbon layer. The sliding member has the protective film which has excellent frictional wear resistance property and satisfactory adhesion property to the substrate, regardless of having a simple structure.

15 Claims, 7 Drawing Sheets

Fig. 3A
Fig. 3B
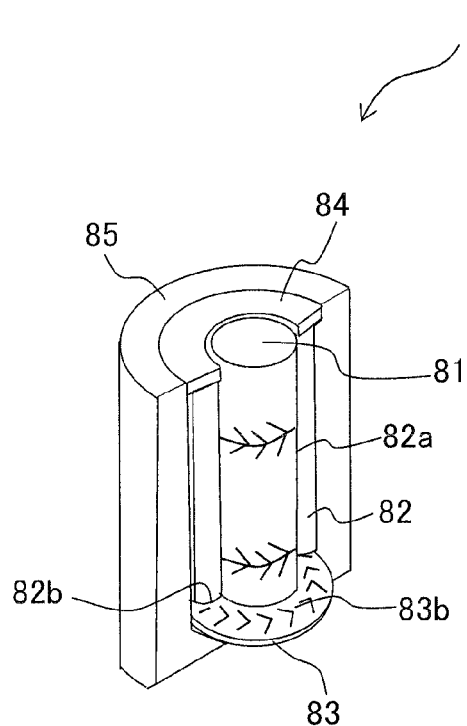
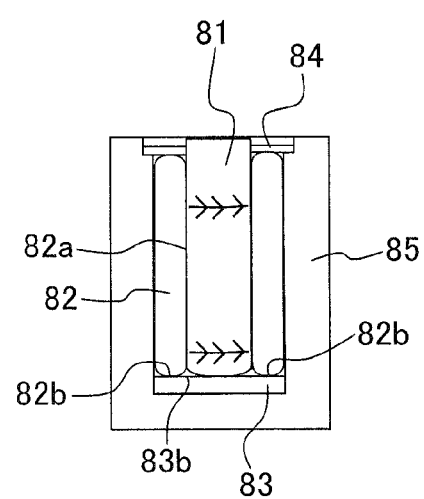

$P_{Ar}$ = 5Pa
V = 0V
H = 7GPa $P_{Ar}$ = 1Pa
V = 0V
H = 13GPa $P_{Ar}$ = 0.2Pa
V = 0V
H = 17GPa $P_{Ar}$ = 5Pa
V = -100V
H = 20GPa $P_{Ar}$ = 1Pa
V = -100V
H = 25GPa $P_{Ar}$ = 0.2Pa
V = -100V
H = 40GPa $P_{Ar}$: PRESSURE DURING FILM-FORMATION
V: BIAS VOLTAGE
H: HARDNESS

SLIDING MEMBER AND FLUID DYNAMIC PRESSURE BEARING APPARATUS

CROSS REFERENCE TO RELATED APPLICATION

The present application claims priority from Japanese Patent Applications No. 2011-277468 filed on Dec. 19, 2011 and No. 2012-224766 filed on Oct. 10 2012 the disclosures of which are incorporated herein by reference in their entireties.

BACKGROUND OF THE INVENTION

1. Field of the Invention:

The present invention relates to a sliding member and a fluid dynamic pressure bearing apparatus using the sliding member.

2. Description of the Related Art:

In the recent years, a fluid dynamic bearing (FDB) using an oil as fluid is used as the bearing for a motor. The fluid dynamic bearing has a long service life and causes less noise as compared with a ball bearing, and thus the fluid dynamic bearing is adopted in a hard disk drive, a heat exhaust fan, etc. In some cases, a high-lubricity coating is applied on a sliding surface of the fluid dynamic bearing, in addition to a dynamic-pressure generating groove formed on the sliding surface. As such a high-lubricity coating, a diamond-like carbon layer (DLC layer) is used in many cases. The diamond-like carbon layer generally has excellent frictional wear resistance property and high hardness.

On the other hand, a diamond-like carbon layer which has a high hardness (high-hardness diamond-like carbon layer) has high density and thus has high film stress, and has low adhesion property with respect to a base member or substrate. This consequently causes such a problem that the high-hardness diamond-like carbon separates from the substrate. Conventionally, a base layer formed of a metal such as chromium is provided for the purpose of improving the adhesiveness between the diamond-like carbon layer and the substrate. However, although the base layer made of metal is capable of preventing a low-hardness diamond-like carbon layer having a hardness of about 10 GPa from separation, the base layer made of metal is not capable of sufficiently preventing a high-hardness diamond-like carbon layer (hardness of about 30 GPa, for example) having excellent frictional wear resistance property from separation. For this reason, Japanese Patent Application Laid-open No. 2004-10923 discloses providing a hardness-gradient diamond-like carbon layer with varying hardness in the thickness direction thereof, in addition to a metal base layer. Further, Japanese Patent Application Laid-open No. 2008-81630 discloses a sliding member having a multi-layered film in which a low-hardness diamond-like carbon layer and a high-hardness diamond-like carbon layer are alternately stacked, in addition to a metal base layer and a diamond-like carbon layer with increasing hardness in a continuous or stepped manner.

SUMMARY OF THE INVENTION

However, providing a plurality of base layers below the diamond-like carbon layer requires a plurality of kinds of raw materials and a complicated manufacturing process, which in turn increase the manufacturing cost. Further, in a sliding member used in a hard-disk application, it is necessary to consider frictional wear resistance property and/or adhesive property in the presence of oil, for example, in fluid dynamic bearing oil (FDB oil) which does not contain organic molybdenum, etc.

An object of the present invention is to provide a sliding member provided with a protective film having a simple structure but having excellent frictional wear resistance property and satisfactory adhesiveness with respect to the substrate, regardless of the simple structure.

According to a first aspect of the present invention, there is provided a sliding member including: substrate; and a protective film provided on the substrate, the protective film consisting of a metal base layer provided on the substrate, one low-hardness diamond-like carbon layer provided on the metal base layer and one high-hardness diamond-like carbon layer provided directly on the low-hardness diamond-like carbon layer.

According to a second aspect of the present invention, there is provided a fluid dynamic pressure bearing apparatus including the sliding member of the first aspect, in particular, a fluid dynamic pressure bearing apparatus suitable for a spindle motor of a hard disk drive.

According to a third aspect of the present invention, there is provided a sliding member including: a substrate; and a protective film provided on the substrate, the protective film consisting of a metal base layer, a first diamond-like carbon layer which has a columnar structure extending in a thickness direction of the first diamond-like carbon layer and which is formed on the metal base layer, and a second diamond-like carbon layer which has a homogeneous structure and which is formed on the first diamond-like carbon layer.

According to a fourth aspect of the present invention, there is provided a fluid dynamic pressure bearing apparatus including the sliding member of the second aspect which is suitable for a fluid dynamic pressure bearing apparatus, in particular, a fluid dynamic pressure bearing apparatus suitable for a spindle motor of a hard disk drive.

According to a fifth aspect of the present invention, there is provided a spindle motor apparatus of a hard disk drive including the fluid dynamic pressure bearing of the second or fourth aspect.

The sliding member of the aspect has the protective film having such a simple structure that the protective film is composed only of a metal base layer, a low-hardness diamond-like carbon layer provided as a single layer and a high-hardness diamond-like carbon layer provided as a single layer, to thereby realize a satisfactory frictional wear resistance property and to realize a protective film having sufficient adhesiveness with respect to the substrate. Accordingly, the sliding member having the protective film described above can be used as a part or component having a long service life.

BRIEF DESCRIPTION OF THE DRAWINGS

FIG. 3A is a perspective cross-sectional view of the fluid dynamic pressure bearing apparatus of the second embodiment, and FIG. 3B is a cross-sectional view of the same;

FIG. 9 (FIGS. 9A to 9F) is a SEM photograph taken in a preliminary experiment, wherein

DESCRIPTION OF THE PREFERRED EMBODIMENTS

[First Embodiment]

Figure 1:
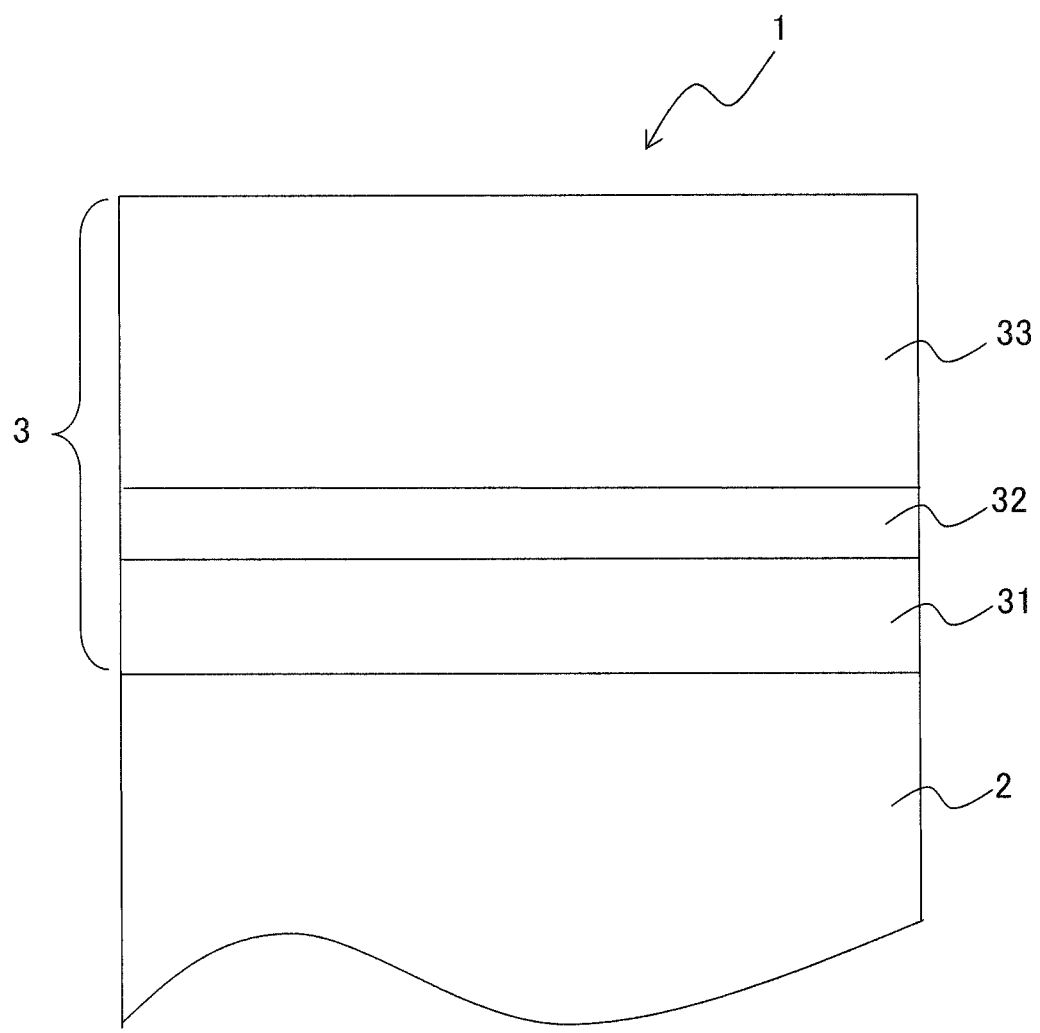
FIG. 1 is a schematic cross-sectional view of a protective film of a sliding member according to a first embodiment.

An explanation will be given about a sliding member as a first embodiment of the present invention. As shown in FIG. 1, a sliding member 1 of the first embodiment has a substrate 2 and a protective film 3 provided on the substrate 2. It is possible to use, as the substrate 2, variety kinds of members or materials depending on the application for which the sliding member 1 is to be used. However, a material for a substrate of a sliding member which is used in a fluid dynamic pressure bearing apparatus is mainly preferable. Such a material for the substrate is exemplified by steel materials which are highly reliable and which can be processed with high precision; among such steel materials, stainless steel such as SUS430F having superior free-cutting property is preferable as the material for the sliding member used in the fluid dynamic pressure apparatus for a spindle motor of a hard disk drive.

The protective film 3 is composed only of a metal base layer 31 provided on the substrate 2, a single low-hardness diamond-like carbon layer 32 provided as a single layer on the metal base layer 31, and a single high-hardness diamond-like carbon layer 33 provided as a single layer directly on the single low-hardness diamond-like carbon layer 32. The metal base layer 31 is used to improve the adhesiveness (adhesion property) of the low-hardness diamond-like carbon layer 32 to the substrate. For example, Cr, Ti, Ta, W, V, Nb, Mo, etc. can be used as the material for the metal base layer 31. However, Cr is particularly preferable in view of the versatility. The metal base layer 31 may be an alloy containing these metals described above. Further, although the metal base layer 31 may be formed of a single layer or a plurality of layers, the single layer is preferable in view of production efficiency. The thickness of the metal base layer 31 is preferably, for example, in a range of 100 nm to 1,000 nm in a case that the protective film has a thickness of 2 μm, in view of the thickness required for exhibiting a good adhesiveness, the production efficiency of the protective film as a whole, the mechanical property of the protective film, etc.

The single low-hardness diamond-like carbon layer 32 (hereinafter referred to as "low-hardness DLC layer" in some cases) is formed of diamond-like carbon having a hardness which is low as compared with the single high-hardness diamond-like carbon layer 33 (hereinafter referred to as "high-hardness DLC layer" in some cases); and the low-hardness DLC layer 32 has a hardness which is uniform (which does not change or vary continuously or in stepped manner) within the layer; the hardness is preferably not more than 17 GPa, and further preferably is 7 GPa to 15 GPa. By setting the hardness of the low-hardness DLC layer 32 in the above-described range, the protective layer 3 can have sufficient adhesiveness with respect to the substrate. On the other hand, the single high-hardness DLC layer 33 is formed of diamond-like carbon having a hardness which is high as compared with the low-hardness DLC layer 32; and the high-hardness DLC layer 33 has a hardness which is uniform (which does not change or vary continuously or in stepped manner) within the layer; the hardness is preferably not less than 28 GPa, and further preferably is 33 GPa to 40 GPa. By setting the hardness of the high-hardness DLC layer 33 in the above-described range, the protective layer 3 can have satisfactory frictional wear resistance property and can also maintain sufficient adhesiveness with respect to the substrate. The ratio of the hardness of the high-hardness DLC layer 33 to the hardness of the low-hardness DLC layer 32 is preferably not less than 1.9. The hardness of each of the low-hardness and high-hardness DLC layers 32 and 33 corresponds to a value measured according to the nanoindentation method (instrumented indentation testing method) which is appropriate for hardness measurement of a thin film. The nanoindentation method is standardized by ISO-14577-1, 2, 3 and 4, and is appropriate for measuring the hardness of thin films with a film thickness of nanometer-order to micron-order. Further, in the present application, the term "diamond-like carbon" (hereinafter referred to as "DLC" in some cases) means a hard amorphous film formed of carbon isotope or hydrocarbon.

Since the protective film 3 of the embodiment has the high-hardness DLC layer 33 as the uppermost layer (no other layer is present on the high-hardness DLC layer 33), the protective film 3 can obtain sufficient frictional wear resistance property required for the sliding member 1. Further, since the protective film 3 has the high-hardness DLC layer 33 formed directly on the low-hardness DLC layer 32 which is a single layer and has a low film stress, it is possible to obtain sufficient adhesiveness with respect to the substrate 2 and the metal base layer 31. As described above, the protective layer 3 of the embodiment has a simple structure formed only of the metal base layer 31, the single low-hardness DLC layer 32 and the single high-hardness DLC layer 33, but is capable of obtaining both of the frictional wear resistance property and the sufficient adhesion to the substrate 2. Accordingly, the sliding member 1 having the protective film 3 can be used as a part or component having a long service life.

In the embodiment, the total thickness of the high-hardness DLC layer 33 and the low-hardness DLC layer 32 (total of the thickness of the high-hardness DLC layer 33 and the thickness of the low-hardness DLC layer 32) is preferably 0.4 μm to 2.0 μm in view of the mechanical property and the production efficiency. Further, the ratio of the thickness of the high-hardness DLC layer 33 with respect to the total thickness of the high-hardness and low-hardness DLC layers 33 and 32 (hereinafter referred to as "ratio of the high-hardness DLC layer" in some cases) is preferably 75% to 95%. By making the ratio of the high-hardness DLC layer be 75% to 95%, it is possible to impart the protective film 3 of the embodiment with further satisfactory frictional wear resistance and sufficient adhesiveness to the substrate 2.

In the embodiment, although the high-hardness DLC layer 33 and the low-hardness DLC layer 32 each have the amorphous structure as described above, it is preferable that the high-hardness DLC layer 33 has a homogeneous structure within the layer and that the low-hardness DLC layer 32 has a columnar structure extending in the thickness direction of the layer. By the high-hardness DLO layer 33 having the homogeneous amorphous structure within the layer, the protective film 3 can be a high-hardness film and can obtain satisfactory frictional wear resistance property. Further, by the low-hardness DLC layer 32 having the columnar amorphous structure, the film stress of the protective film 3 is relaxed, which in turn makes it possible to obtain sufficient adhesion property between the protective film 3 and the substrate 2.

In the embodiment, it is preferable that both of the high-hardness DLC layer 33 and the low-hardness DLC layer 32 do not contain hydrogen. For example, in a case that the sliding member 1 of the embodiment is a sliding member used in a fluid dynamic pressure bearing apparatus for a spindle motor and that a rotating/sliding surface of the sliding member is an insulator, then the electric charge is accumulated. When the conductivity of the protective film 3 is not sufficient, spark is generated as the discharge phenomenon, which in turn leads to failure and/or damage of the motor. Since hydrogen contained in the DLC layer lowers the conductivity, it is desirable to use a DLC layer not containing hydrogen. Here, the phrase that DLC layer "does not contain hydrogen" means that the DLC layer does not substantially contain hydrogen, and encompasses also a case that the DLC layer contains hydrogen in a content amount not more than measurement error or measurement limit of an analyzing device (for example, in an amount of few atomic %).

As described above, the sliding member 1 of the embodiment is preferably a sliding member usable in a fluid dynamic pressure bearing apparatus, and is suitable, for example, for a fluid dynamic pressure bearing apparatus for a spindle motor of a hard disk drive (hereinafter referred to as "HDD", as appropriate), for a fluid dynamic pressure bearing apparatus for a heat exhaust fan, etc. However, the sliding member of the embodiment is not limited to the application to the fluid dynamic pressure bearing apparatus, and may be applied to a variety of apparatuses having a sliding surface, friction surface, etc. Such apparatuses are exemplified by a ball for a rolling bearing, a ball raceway groove, etc.

Next, an explanation will be given about a manufacturing method for producing the sliding member 1 of the embodiment. The sliding member 1 can be produced by forming the protective film 3 on the substrate 2. As the forming method of the protective film 3, it is possible to use conventional film-forming methods such as the sputtering method, the ion plating method, the vacuum deposition method, the CVD method, etc. However, it is preferable to use the sputtering method. Further, in the sputtering method, a DLC layer which does not substantially contain hydrogen can be easily formed by using a target material made of carbon element which does not contain hydrogen to form the high-hardness DLC layer 33 and the low-hardness DLC layer 32.

In the embodiment, the high-hardness DLC layer 33 and the low-hardness DLC layer 32 can be formed by adjusting the hardness of each of the high-hardness and low-hardness DLC layers 33 and 32 with variety kinds of methods. For example, in a case of performing film-formation with the sputtering method, the hardness of DLC layer can be adjusted by the intensity of the bias voltage applied to the substrate, or by the content of hydrogen to be contained in the DLC layer. Generally, it is possible to increase the hardness of the DLC layer by increasing the applied bias voltage, and to decrease the hardness of the DLC layer by increasing the content of hydrogen in the DLC layer. In a case of using the sliding member of the embodiment in the fluid dynamic pressure bearing apparatus for the spindle motor of the hard disk drive, it is preferable that the DLC layer does not contain hydrogen in view of the conductivity of the sliding member as described above. Therefore, it is preferable to adjust the hardness of each of the high-hardness DLC layer 33 and the low-hardness DLC layer 32 by the intensity of the bias voltage to be applied during the film formation.

In a case that the protective film 3 is formed by the sputtering method, it is preferable that the low-hardness DLC layer 32 is formed under a condition that no bias voltage is applied to the substrate. Further, it is possible to adjust the hardness of the low-hardness DLC layer 32 within a range of 7 GPa to 17 GPa by, for example, parameters such as the pressure during film-formation and/or the distance between the target and the substrate. On the other hand, it is preferable that the high-hardness DLC layer 33 is formed by applying a bias voltage to the substrate during the film-formation of the high-hardness DLC layer 33, and the hardness of the high-hardness DLC layer 33 can be adjusted within a range of 20 GPa to 40 GPa. Note that the above-described values of the hardness are a value measured by the nanoindentation method.

In a case of forming the protective film 3 with the sputtering method, it is sufficient to prepare only two types of target as the raw materials of the layers, namely a target for the metal base layer 31 and a common carbon target for the high-hardness and low-hardness DLO layers 33 and 32. Further, it is possible to use noble gas such as Ar as the gas for electric discharge, which may be commonly used for formation of all the respective layers. Accordingly, it is possible to reduce the production steps, thereby making it possible to suppress the production cost.

[Second Embodiment]

Figure 2:
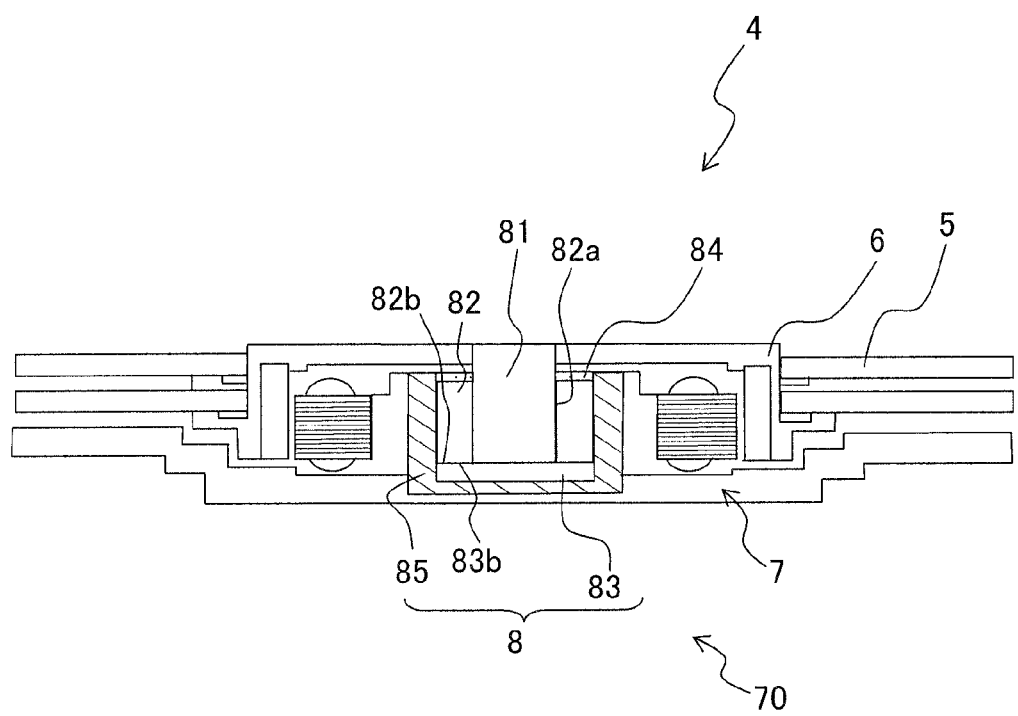
FIG. 2 is a schematic cross-sectional view of a hard disk drive provided with a fluid dynamic pressure bearing apparatus according to a second embodiment.

Regarding a fluid dynamic pressure bearing apparatus including the sliding member of the first embodiment, an explanation will be given considering as example a fluid dynamic pressure bearing apparatus for a spindle motor of a hard disk drive (HDD). A hard disk drive (HDD) 4 shown in FIG. 2 is mainly composed of a plurality of disks 5, a hub 6 supporting the disks 5, a spindle motor 7 having a permanent magnet, a coil, etc., and a fluid dynamic pressure bearing apparatus 8. An apparatus provided with the spindle motor 7 and the dynamic fluid pressure bearing apparatus 8 is also referred to as a spindle motor apparatus 70. As shown in FIGS. 2, 3A and 3B, the fluid dynamic pressure bearing apparatus 8 is mainly composed of a shaft 81, a cylinder-shaped bearing sleeve 82 having a through hole 82a which accommodates the shaft 81 therein, a disk-shaped thrust bearing 83 arranged at the lower end of shaft 81, a seal 84 and a housing 85 accommodating the above-described parts or components 81 to 84 therein. In the following description, the bearing sleeve 82 and the thrust bearing 83 are collectively described as "bearing members 82, 83" as necessary. Inside the housing 85, the gap between the shaft 81 and the bearing member 82, and the gap between the shaft 81 and the bearing member 83 are filled by an oil, and an upper portion of the housing 85 is sealed and closed by the seal 84 so as to prevent the oil from leaking to the outside of the housing 85. Further, as shown in FIGS. 3A and 3B, a dynamic pressure generating groove having a herringbone or spiral shape is formed on the side surface (outer circumferential surface) of the shaft 81; and further, a dynamic pressure generating groove is also formed on a sliding surface 83b, of the thrust bearing 83, which makes contact with an end surface 82b of the bearing sleeve 82.

In the HDD 4 related to the second embodiment, the hub 6 is fixed to the shaft 81 of the fluid dynamic pressure bearing apparatus 8, and the spindle motor 7 rotates the hub 6 to thereby rotate the disks 5 and the shaft 81. At this time, the oil (fluid) between the shaft 81 and the bearing sleeve (bearing member) 82 or between the sleeve 82 and the thrust bearing (bearing member) 83 is made to flow along the groove patterns of the dynamic pressure generating grooves and is pressed against the groove patterns so as to locally generate a high-pressure portion in the oil, thereby supporting the side surface (outer circumferential surface) of the rotating shaft 81 by the bearing sleeve 82 and supporting the bottom surface of the rotating shaft 81 by the thrust bearing 83. In such a manner, when the shaft 81 is being rotated, the oil is intervened between the shaft 81 and the bearing sleeve 82 and between the shaft 81 and the thrust bearing 83 and creates in a non-contact state between the shaft 81 and the bearing sleeve 82 and between the sleeve 82 and the thrust bearing 83. However, this does not mean that contact and sliding movement do not occur at all between the shaft 81 and the bearing sleeve 82 and between the sleeve 82 and the thrust bearing 83. In particular, at the time of start-up and stop of the spindle motor 7, contact and sliding movement are normally occurred between the shaft 81 and the bearing sleeve 82 and between the sleeve 82 and the thrust bearing 83.

In the HOD 4 related to the second embodiment, the sliding member of the first embodiment is used in the thrust bearing 83. The protective film 3 which is composed only of the metal base layer, the single low-hardness DLC layer and the single high-hardness DLC layer (see FIG. 1) is formed on the sliding surface 83b, in the thrust bearing 83, which slidably moves with respect to the bearing sleeve 82. The protective film 3 provided on the thrust bearing 83 has frictional wear resistance property and sufficient adhesiveness to the substrate, regardless of having the simple structure. The thrust bearing 83 having such a protective film 3 has a long service life, resulting in the improvement in the durability and service life of the fluid dynamic pressure bearing apparatus 8 using the thrust bearing 83.

As described above, the dynamic pressure generating groove is formed on the sliding surface 83b of the thrust bearing 83. Since the depth of the dynamic pressure generating groove on the sliding surface 83b is 7 pin to 20 pin, the thickness of the protective film 3 on the sliding surface 83b is preferably not more than 2,000 nm so as not to fill the dynamic pressure generating groove, and is preferably not less than 150 nm so that a satisfactory film strength can be obtained.

Since the fluid dynamic pressure bearing apparatus for the spindle motor of the HDD is a precision component and is required to perform highly precise operation, the sliding surface 83b of the thrust bearing 83 is required to be a flat surface. Further, since the structure such as the dynamic pressure generating groove is provided on the sliding surface 83b, it is not possible to perform polishing for the sliding surface 83b after the protective film 3 has been formed. In the present embodiment, the high-hardness DLC layer which is the uppermost layer of the protective film 3 has a highly flat surface. In particular, the high-hardness DLC layer formed by the sputtering method with a high bias voltage is compact and has a very flat surface, and thus is suitable for the sliding member used in the fluid dynamic pressure bearing apparatus for the spindle motor of the HDD.

Note that in the second embodiment, the sliding member of the first embodiment is used for the thrust bearing 83. However, the sliding member of the first embodiment may be used in the bearing sleeve 82. In such a case, the protective film 3 is formed on the end surface 82b, of the bearing sleeve 82, which moves slidably with the thrust bearing 83. Further, in the second embodiment, although the dynamic pressure generating groove is formed in the shaft 81, it is possible to form the dynamic pressure generating groove on the inner circumferential surface of the thrust sleeve 82 defining the through hole 82a and facing the shaft 81, instead of forming the dynamic pressure generating groove on the shaft 81. Furthermore, in the second embodiment, although the dynamic pressure generating groove is formed on the surface 83b of the thrust sleeve 83, it is possible to form the dynamic pressure generating groove on the end surface 82b of the bearing sleeve 82, instead of forming the dynamic pressure generating groove on the surface 83b of the bearing sleeve 83. Moreover, although the second embodiment was explained considering the fluid dynamic pressure bearing apparatus 8 in which the shaft 81 is rotated, the fluid dynamic pressure bearing apparatus may be a fluid dynamic pressure bearing apparatus in which the shaft is fixed and the bearing member is rotated.

Note that in the second embodiment, although the fluid dynamic pressure bearing apparatus for the spindle motor of the HDD was explained, the fluid dynamic pressure bearing apparatus of the second embodiment is not limited to this. The fluid dynamic pressure bearing apparatus of the present invention can be used in, for example, a heat exhaust fan, a shaft of a machine tool, etc., in addition to the spindle motor of the HOD.

EXAMPLES

In the following, the present invention will be explained by examples. However, the present invention is not limited to the examples as described below.

By the following preliminary experiment, samples each having a DLC layer formed thereon under a plurality of film-forming conditions, respectively, were prepared, and the hardness of each of the samples was measured and the cross-sectional structure of each of the samples was observed.

Preparation of Samples A to F

As a substrate, six pieces of a disk-shaped stainless steel plate with a diameter of about 10 mm and a thickness of about 1 mm were prepared. As a metal base layer, a chromium layer was formed on each of the stainless steel plates by the sputtering method with a thickness of 0.2 μm. The chromium layer was formed using a metal chromium target under the following conditions: pressure during film-formation in the film-forming chamber of the sputtering device: 2 Pa; sputtering power (Cr): 6 kW; and introduction rate of argon gas as electric discharge gas: 200 cc/min. Further, the bias voltage applied to the substrate was −100 V.

Next, a first DLC layer was formed by the sputtering method on the chromium layer. The first DLC layer was formed using a carbon target under the following conditions: sputtering power (C): 6 kW; bias voltage: 0 V; and introduction rate of argon gas as electric discharge gas: 200 cc/min. Further, during the film-formation of Samples A to C, the pressure in the film-forming chamber of the sputtering device were respectively 5 Pa, 1 Pa and 0.2 Pa, and the thickness of the first DLC layer was made to be 1 μm in each of Samples A to C. During the film-formation of Samples D to F, the pressure in the film-forming chamber of the sputtering device was 1 Pa for each of Samples D to F, and the thickness of the first DLC layer was made to be 170 nm in each of Samples D to F. Further, on the first DLC layer of each of Samples D to F, a second DLC layer was formed under conditions similar to those for the first DLC layer, except that the bias voltage was −100 V and that the pressures during film-formation were 5 Pa, 1 Pa and 0.2 Pa for Samples D to F, respectively. Note that the total thickness of the first and second DLC layers in each of Samples D to F was 1 μm. The hardness of the DLC layer of each of Samples A to F was measured by the above-described nanoindentation method using a nanoindentation hardness tester (model name: ENT-1100a, produced by ELIONIX INC.). The hardness of the DLC layer in each of Samples A to F was 7 GPa, 13 GPa, 17 GPa, 20 GPa, 25 GPa and 40 GPa, respectively.

Figure 9A:
FIGS. 9A to 9F show SEM photographs of Samples A to F, respectively, prepared in the preliminary experiment.
Figure 9B:
Figure 9C:
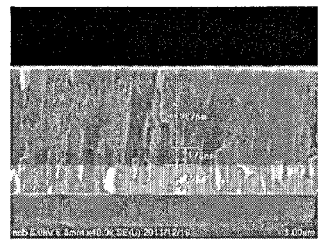
Figure 9D:
Figure 9E:
Figure 9F:

FIGS. 9A to 9F are photographs showing the cross-sections of Samples A to F, respectively. As shown in each of FIGS. 9A to 9F, a film composed only of the base metal layer 31 made of chromium and the DLC layer(s) is formed on a substrate 2. Samples A to C, having only the first DLC layer formed on the metal base layer 31 with a bias voltage of 0 V, showed a hardness ranging from 7 to 17 GPa. Samples A to C each presented a plurality of columnar amorphous structures extending in the thickness direction from the interface between the metal base layer and the first DLC layer up to the outer surface of the first DLC layer, as shown in FIGS. 9A to 9C. On the other hand, Samples D to F each having the second DLC layer formed on the first DLC layer, which was formed with a bias voltage of −100 V, resulted in a hardness ranging from 20 GPa to 40 GPa. Each of Samples D to F had a structure in which the first DLC layer has a plurality of columnar amorphous structures extending in the thickness direction, and the second DLC layer had homogeneous amorphous structure with no streak extending in the thickness direction, as shown in FIGS. 9D to 9F.

From the preliminary experiment described above, it is appreciated that when no bias voltage was applied during the film-formation of DLC layer by sputtering, a low-hardness DLC layer having the columnar amorphous structure and a hardness of not more than 17 GPa was formed, whereas when the bias voltage was applied during the film-formation of DLC layer by sputtering, a high-hardness DLC layer having a homogeneous amorphous structure and a hardness of not less than 20 GPa was formed.

Preparation of Samples 1-6

A disk-shaped stainless steel plate having a diameter of about 10 mm and a thickness of about 1 mm was prepared as the substrate; and a chromium layer as the metal base layer was formed by sputtering method as a film on the stainless steel plate. The chromium layer was made to have a thickness of 0.2 μm. The film-formation of the chromium layer was performed by using a metal chromium target under the following conditions: pressure during film-formation in a film-forming chamber of a sputtering device: 2 Pa; sputtering power (Cr): 6 kW; introduction rate of argon gas as the electric discharge gas: 200 cc/min. Further, the bias voltage applied to the substrate was −100 V.

Next, a low-hardness DLC layer was formed by the sputtering method on the chromium layer. The film-formation of the low-hardness DLC layer was performed by using a carbon target under the following conditions: pressure during film-formation in the film-forming chamber of the sputtering device: 2 Pa; sputtering power (C): 6 kW; introduction rate of argon gas as electric discharge gas: 200 cc/min. Any bias voltage was not applied to the substrate during the film-formation of the low-hardness DCL layer. The hardness of the formed low-hardness DLC layer was measured by the above-described nanoindentation method with the nanoindentation hardness tester (model name: ENT-1100a, produced by ELIONIX INC.). The hardness of the low-hardness DLC layer was 14.3 GPa.

Next, a high-hardness DLC layer was formed on the low-hardness DLC layer by the sputtering method. The film-formation of the high-hardness DLC layer was performed under the similar conditions as those for forming the low-hardness DLC layer, except that the bias voltage of −25 V was applied to the substrate. The hardness of the formed high-hardness DLC layer was measured by the nanoindentation method in a similar manner as that for the low-hardness DLC layer described above. The hardness of the high-hardness DLC layer was 20.0 GPa.

The total of the thicknesses (total thickness) of the low-hardness DLC layer and the high-hardness DLC layer was made to be 1 μm. Further, in Samples 1 to 6, the ratios of the high-hardness DLC layer were made to be 10%, 50%, 70%, 75%, 90% and 95%, respectively. The ratios of the high-hardness DLC layers in Samples 1 to 6 were adjusted by the duration of times for the film-formations of the low-hardness DLC layers and the high-hardness DLC layers, respectively. Note that since any of the film-formation conditions for the low-hardness DLC layers and the high-hardness DLC layer was not changed during the film-formation process, each of the low-hardness and high-hardness DLC layers resulted in an uniform layer structure (composition) and hardness (in particular, uniform in the thickness direction thereof). In the manner described above, Samples 1 to 6, each having the protective film formed on the substrate and composed only of the metal base layer, the low-hardness DLC layer and the high-hardness DLC layer, were prepared.

Preparation of Sample 7 (Comparative Example 1)

Sample 7 was prepared by a similar method as that for Samples 1 to 6, except that the high-hardness DLC layer was not formed on the low-hardness DLC layer. In other words, Sample 7 has a protective film which is composed only of the metal base layer and the low-hardness DLC layer formed on the substrate which means the ratio of the high-hardness DLC layer is 0% in Sample 7. The low-hardness DLC layer was made to have a thickness of 1 μm.

Preparation of Sample 8 (Comparative Example 2)

Sample 8 was prepared by a similar method as that for Samples 1 to 6, except that the high-hardness DLC layer was formed directly on the metal base layer made of chromium without the low-hardness DLC layer. Therefore, Sample 8 has a protective film which is composed only of the metal base layer and the high-hardness DLC layer formed on the substrate which means the ratio of the high-hardness DLC layer is 100% in Sample 8. The high-hardness DLC layer was made to have a thickness of 1 μm.

Preparation of Samples 9-14

Samples 9 to 14 are samples each having a protective film on a substrate consisting of the metal base layer, the low-hardness DLC layer and the high-hardness DLC layer. Each of Samples 9 to 14 was prepared by a similar method as that for Samples 1 to 6, except that a bias voltage of −50 V was applied to the substrate during the film-formation of the high-hardness DLC layer. The hardness of the high-hardness DLC layer formed in each of Samples 9 to 14 was measured by the nanoindentation method in a similar manner as that described above regarding Samples 1 to 6. The hardness of the high-hardness DLC layer in each of Samples 9 to 14 was 28.0 GPa.

Preparation of Sample 15 (Comparative Example 3)

Sample 15 was prepared by a similar method as that for Samples 9 to 14, except that the high-hardness DLC layer was formed directly on the metal base layer made of chromium without the low-hardness DLC layer. In other words, Sample 15 has a protective film consisting only of the metal base layer and the high-hardness DLC layer formed on the substrate which means the ratio of the high-hardness DLC layer is 100% in Sample 15. The high-hardness DLC layer was made to have a thickness of 1 μm.

Preparation of Samples 16-21

Samples 16 to 21 are samples each having, on a substrate, a protective film composed only of the metal base layer, the low-hardness DLC layer and the high-hardness DLC layer. Each of Samples 16 to 21 was prepared by a similar method as that for Samples 1 to 6, except that a bias voltage of −100 V was applied to the substrate during the film-formation of the high-hardness DLC layer. The hardness of the high-hardness DLC layer formed in each of Samples 16 to 21 was measured by the nanoindentation method in a similar manner as described above regarding Samples 1 to 6. The hardness of the high-hardness DLC layer in each of Samples 16 to 21 was 31.6 GPa.

Preparation of Sample 22 (Comparative Example 4)

Sample 22 was prepared by a similar method as that for Samples 16-21, except that the high-hardness DLC layer was formed directly on the metal base layer made of chromium without the low-hardness DLC layer. Thus, Sample 22 has a protective film which is composed only of the metal base layer and the high-hardness DLC layer formed on the substrate which means the ratio of the high-hardness DLC layer is 100% in Sample 22. The high-hardness DLC layer was made to have a thickness of 1 μm.

Preparation of Samples 23-28

Samples 23 to 28 are samples each having a protective film on a substrate composed only of the metal base layer, the low-hardness DLC layer and the high-hardness DLC layer. Each of Samples 23 to 28 was prepared by a similar method as that for Samples 1 to 6, except that a bias voltage of −200 V was applied to the substrate during the film-formation of the high-hardness DLC layer. The hardness of the high-hardness DLC layer formed in each of Samples 23 to 28 was measured by the nanoindentation method in a similar manner as described above regarding Samples 1 to 6. The hardness of the high-hardness DLC layer in each of Samples 23 to 28 was 35.3 GPa.

Preparation of Sample 29 (Comparative Example 5)

Sample 29 was prepared by a similar method as that for preparing each of Samples 23 to 28, except that the low-hardness DLC layer was not formed on the metal base layer made of chromium and that the high-hardness DLC layer was formed directly on the metal base layer. Thus, Sample 29 has a protective film composed only of the metal base layer and the high-hardness DLC layer formed on the substrate which means the ratio of the high-hardness DLC layer is 100% in Sample 29. The high-hardness DLC layer was made to have a thickness of 1 μm.

Figure 7:
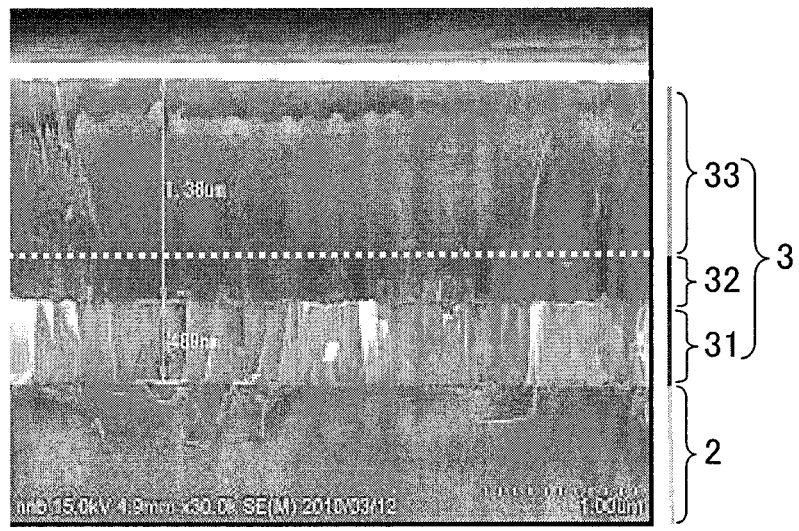
FIG. 7 is a SEM (scanning electron microscope) photograph of the protective film of an example (Sample 4) of the sliding member.
Figure 8:
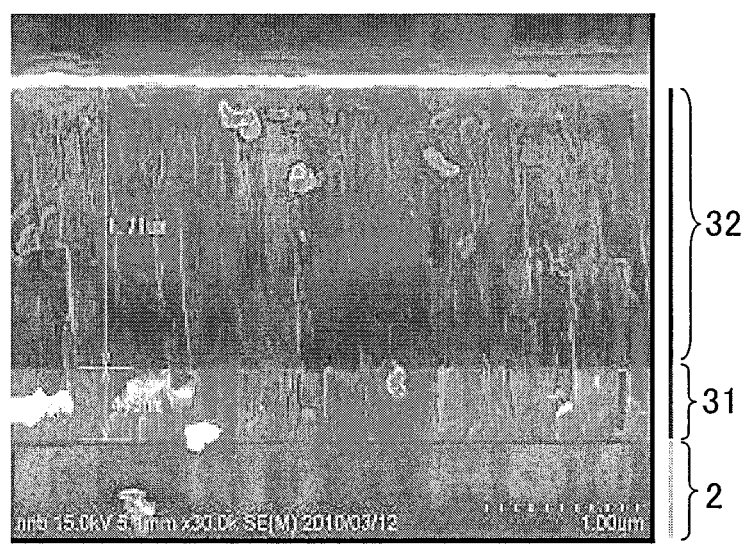
FIG. 8 is a SEM photograph of a protective film of a conventional sliding member (Sample 7)

Among Samples 1 to 29 prepared above, FIG. 7 shows the cross-sectional photograph of the protective film of Sample 4 and FIG. 8 shows the cross-sectional photograph of the protective film of Sample 7 (Comparative Example 1). As shown in FIG. 7, Sample 4 has a protective film 3 which is formed on the substrate 2 and which is composed only of the metal base layer 31 formed of chromium, the low-hardness DLC layer 32 and the high-hardness DLC layer 33. Note that in FIG. 7, a broken line is added to the photograph so as to clearly show the boundary between the low-hardness DLC layer 32 and the high-hardness DLC layer 33. As shown in FIG. 8, Sample 7 (Comparative Example 1) has only the metal base layer 31 formed of chromium and the low-hardness DLC layer 32 which are formed on the substrate. The protective film of Sample 7 (Comparative Example 1) having such a construction as described above has a structure similar to that of a conventionally known protective film.

With respect to Sample 1 to 29 prepared above, bending adhesion test and frictional wear resistance test were performed as explained below, and Samples 1 to 29 were evaluated in view of the bending adhesion test and the frictional wear resistance test, based on the criteria indicated below. The evaluation results are shown in Tables 1 to 4 as follows. Note that in all of Tables 1 to 4, the evaluation results for Sample 7 (Comparative Example 1) are indicated as a sample in which the ratio of the high-hardness DLC layer is 0%, for the reference purpose.

[Bending Adhesion Test]

Each of Samples 1 to 29 prepared above was forcibly bent at a central portion of the substrate thereof, and was deformed. The state of separation of the protective film in each of the samples at the deformed portion was visually observed, and the bending adhesion property of each of the samples was evaluated based on the following evaluation criterion.

Evaluation Criterion for Bending Adhesion property:

+: No separation of the protective film occurred at the deformed portion.

−: Separation of the protective film occurred at the deformed portion.

[Frictional Wear Resistance Test]

Figure 6:
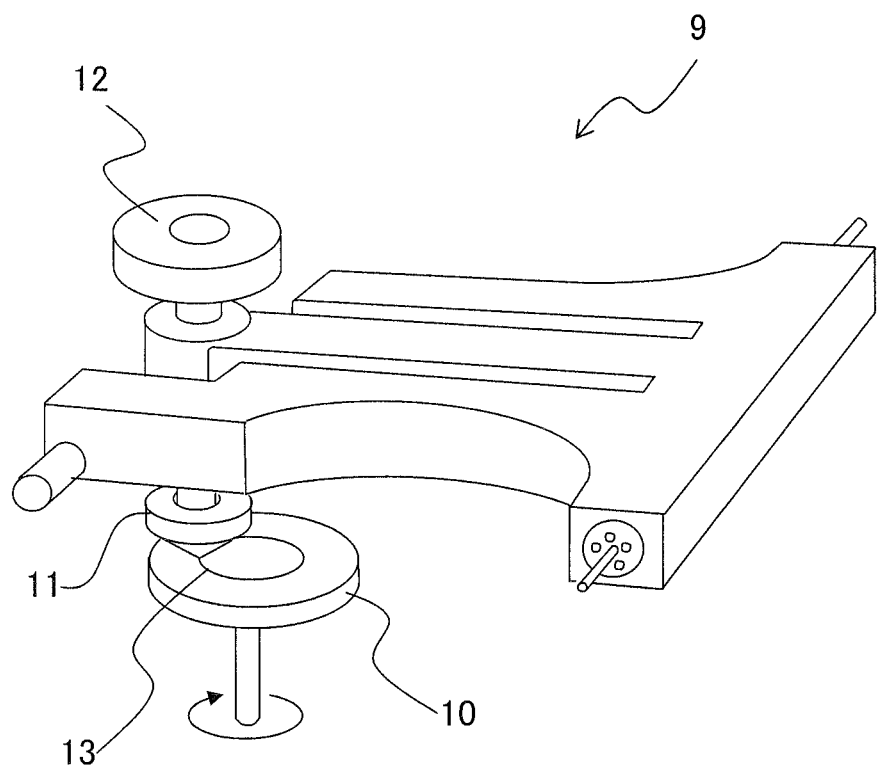
FIG. 6 is a schematic view of a ball-on-disk test device used in examples.

Frictional wear resistance test was performed by using a ball-on-disk test device 9 shown in FIG. 6, according to the following method. Each of Samples 1 to 29 prepared above was formed to have the shape of disk 10 as shown in FIG. 6, and was placed in the test device. A ball 11 was set on the protective film of the sample. The ball 11 was fixed and a load of 20N (=1.7 GPa) was applied from upside of the ball 11 using a weight 12. In this state, the disk 10 was repeatedly subjected to a start/stop operation by which the disk 10 was rotated at the rotational speed of 150,000 rpm for 5 minutes followed by 5 seconds of stop, completing a total of 300 minutes of successive rotation and sliding. This test was performed to simulate the condition in that each of Samples 1 to 29 (disks 10) is used as a sliding member in a fluid dynamic pressure bearing apparatus of the spindle motor for the hard disk drive. In order to approximate the test condition to the operational environment of a fluid dynamic pressure bearing apparatus, the disk 10 was evaluated in oil, or applying a low-viscosity oil for FOB (fluid dynamic bearing) onto the disk 10, so that the test was performed with an oil film formed in the interface between the disk 10 and the ball 11. Hereinafter, the above-described test condition may be referred to as a test "in oil".

After the test, the volume (wear amount) of a wear trace 13 appearing on each of the disks 10 was measured, and the state of the protective film on each of the samples (disks 10) after the test was visually observed. From the measurement and the visual observation results, the frictional wear resistance property of each of the samples was evaluated based on the following evaluation criterion.

Evaluation Criterion for Frictional Wear Resistance property:

+: The wear amount was not more than 0.0025 mm³, and no substantial change in the outer appearance was observed as compared with that before performing the test.

±: The wear amount was not less than 0.0025 mm³, and an external discontinuity of the protective film (such as the exposed base layer, etc.) was slightly observed.

−: The wear amount was not less than 0.0040 mm³, or an external discontinuity of the protective film (such that the exposed base layer, etc.) was observed at almost all regions of the sample.

The frictional wear resistance test (ball-on-disk test) was performed to simulate the condition in that the sliding member (disk 10) is used as the fluid dynamic bearing of the HOD. It is understood that in the fluid dynamic bearing of the HDD, the breakage of oil film occurs when the HDD is started-up or stopped, and this is the moment in which the HDD is most greatly damaged. In view of this situation, the frictional wear resistance test was performed by repeatedly performing the start/stop operation of the disk 10 in oil. Further, the load applied to the ball 11 was determined to be not less than 1.7 GPa in terms of the maximum contact pressure, which is a value close to the elastic deformation limit (2 to 3 GPa) of the disk 10 where the disk 10 does not suffer any plastic deformation. In such a manner, this frictional wear resistance test is a high load test simulating the operational condition of the HOD at the start-up and stop, the high impact load applied to the HOD when the HDD is dropped, etc.

TABLE 1

| | Ratio (%) of High-hardness DLC layer (Hardness: 20.0 GPa) | Bending Adhesion property | Frictional Wear Resistance property |
|---|---|---|---|
| Sample 7 (Comparative Example 1) | 0 | + | − |
| Sample 1 | 10 | + | − |
| Sample 2 | 50 | + | − |
| Sample 3 | 70 | + | − |
| Sample 4 | 75 | + | ± |
| Sample 5 | 90 | + | ± |
| Sample 6 | 95 | + | ± |
| Sample 8 (Comparative Example 2) | 100 | + | ± |

TABLE 2

| | Ratio (%) of High-hardness DLC layer (Hardness: 28.0 GPa) | Bending Adhesion property | Frictional Wear Resistance property |
|---|---|---|---|
| Sample 7 (Comparative Example 1) | 0 | + | − |
| Sample 9 | 10 | + | − |
| Sample 10 | 50 | + | − |
| Sample 11 | 70 | + | ± |
| Sample 12 | 75 | + | + |
| Sample 13 | 90 | + | + |
| Sample 14 | 95 | + | + |
| Sample 15 (Comparative Example 3) | 100 | − | ± |

TABLE 3

| | Ratio (%) of High-hardness DLC layer (Hardness: 31.6 GPa) | Bending Adhesion property | Frictional Wear Resistance property |
|---|---|---|---|
| Sample 7 (Comparative Example 1) | 0 | + | − |
| Sample 16 | 10 | + | − |
| Sample 17 | 50 | + | − |
| Sample 18 | 70 | + | ± |
| Sample 19 | 75 | + | + |
| Sample 20 | 90 | + | + |
| Sample 21 | 95 | + | + |
| Sample 22 (Comparative Example 4) | 100 | − | − |

TABLE 4

| | Ratio (%) of High-hardness DLC layer (Hardness: 35.3 GPa) | Bending Adhesion property | Frictional Wear Resistance property |
|---|---|---|---|
| Sample 7 (Comparative Example 1) | 0 | + | − |
| Sample 23 | 10 | + | − |
| Sample 24 | 50 | + | ± |
| Sample 25 | 70 | + | ± |
| Sample 26 | 75 | + | + |
| Sample 27 | 90 | + | + |
| Sample 28 | 95 | + | + |
| Sample 29 (Comparative Example 5) | 100 | − | − |

As shown in Table 1, in Sample 7 (Comparative Example 1) and Samples 1-3 in each of which the ratio of the high-hardness DLC layer having the hardness of 20.0 GPa was low, the evaluation result of the bending adhesion test was satisfactory (evaluation result: +), but the evaluation result of the frictional wear resistance test was low (evaluation result: −). In each of Samples 4 to 6 and Sample 8 (Comparative Example 2) in which the ratio of the high-hardness DLC layer was not less than 75%, the evaluation result of the frictional wear resistance test was improved slightly (evaluation result: ±), while the evaluation result of the bending adhesion test was satisfactory (evaluation result: +) same as in Sample 7 and Samples 1 to 3.

As shown in Table 2, in Sample 7 (Comparative Example 1) and Samples 9 and 10 in each of which the ratio of the high-hardness DLC layer having the hardness of 28.0 GPa was low, the evaluation result of the bending adhesion test was satisfactory (evaluation result: +), but the evaluation result of the frictional wear resistance test was low (evaluation result: −). In Sample 11 in which the ratio of the high-hardness DLC layer was 70%, the evaluation result of the frictional wear resistance test was improved slightly (evaluation result: ±), while the evaluation result of the bending adhesion test was satisfactory (evaluation result: +) same as in Samples 7, 9 and 10. In Samples 12 to 14 in which the ratios of the high-hardness DLC layer were 75% to 95%, the evaluation result of the bending adhesion test was satisfactory (evaluation result: +) same as in Samples 7, 9 and 10, and further the evaluation result of the frictional wear resistance test was improved to be satisfactory (evaluation result: +). On the other hand, in Sample 15 (Comparative Example 3) in which the ratio of the high-hardness DLC layer was 100%, the evaluation result of the frictional wear resistance test was lowered slightly than those of Samples 12 to 14 (evaluation result: ±), and the evaluation result of the bending adhesion test was also low (evaluation result: −).

As shown in Table 3, in Samples 7 (Comparative Example 1) and Samples 16 and 17 in each of which the ratio of the high-hardness DLC layer having the hardness of 31.6 GPa was low, the evaluation result of the bending adhesion test was satisfactory (evaluation result: +), but the evaluation result of the frictional wear resistance test was low (evaluation result: −). In Sample 18 in which the ratio of the high-hardness DLC layer was 70%, the evaluation result of the frictional wear resistance test was improved slightly (evaluation result: ±), while the evaluation result of the bending adhesion test was satisfactory (evaluation result: +) same as in Samples 7, 16 and 17. In Samples 19 to 21 in which the ratios of the high-hardness DLC layer were 75% to 95%, the evaluation result of the bending and adhesion test was satisfactory (evaluation result: +) same as in Samples 7, 16 and 17, and further the evaluation result of the frictional wear resistance test was improved to be satisfactory (evaluation result: +). On the other hand, in Sample 22 (Comparative Example 4) in which the ratio of the high-hardness DLC layer was 100%, both of the evaluation result of the bending adhesion test and the evaluation result of the frictional wear resistance test were low (evaluation results: −).

As shown in Table 4, in Samples 7 (Comparative Example 1) and Sample 23 in each of which the ratio of the high-hardness DLC layer having the hardness of 35.3 GPa was low, the evaluation result of the bending adhesion test was satisfactory (evaluation result: +), but the evaluation result of the frictional wear resistance test was low (evaluation result: −). In Samples 24 and 25 in which the ratios of the high-hardness DLC layer were 50% to 70%, respectively, the evaluation result of the frictional wear resistance test was improved slightly (evaluation result: ±), while the evaluation result of the bending adhesion test was satisfactory (evaluation result: +) same as in Samples 7 and 23. In Samples 26 to 28 in which the ratios of the high-hardness DLC layer were 75% to 95%, the evaluation result of the bending adhesion test was satisfactory (evaluation result: +) same as in Samples 7 and 23, and further the evaluation result of the frictional wear resistance test was improved to be satisfactory (evaluation result: +). On the other hand, in Sample 29 (Comparative Example 5) in which the ratio of the high-hardness DLC layer was 100%, both of the evaluation result of the bending adhesion test and the evaluation result of the frictional wear resistance test were low (evaluation results: −).

From the evaluation results as explained above and shown in Tables 1 to 4, it was appreciated that when the ratio of the high-hardness DLC layer was 75% to 95%, the bending adhesion property and the frictional wear resistance property were well-balanced and very good evaluation results could be obtained.

Next, a comparative review was performed regarding Samples 5, 13, 20 and 27 which are mutually different from one another in the hardness of the high-hardness DLC layer thereof. In all of Samples 5, 13, 20 and 27, the ratio of the high-hardness DLC layer was 90%. The evaluation results of Samples 5, 13, 20 and 27 and the evaluation result for Sample 7 (Comparative Example 1) for the reference purpose are indicated in Table 5 as follows. Further, FIG. 4 shows the relationship among the bias voltage applied to the substrate during the film-formation of each of Samples 5, 7, 13, 20 and 27, the hardness of the formed DLC layers and the wear amount (volume) in the frictional wear resistance test.

TABLE 5

| | | | Evaluation Items | | |
| --- | --- | --- | --- | --- | --- |
| | Bias (−V) | Hardness (GPa) | Bending Adhesion property | Frictional Wear Resistance | Wear Amount (mm³) |
| Sample 7 (Comparative Example 1) | 0 | 14.3 | + | − | 0.0050 |
| Sample 5 | 25 | 20.0 | + | ± | 0.0037 |
| Sample 13 | 50 | 28.0 | + | + | 0.0015 |
| Sample 20 | 100 | 31.6 | + | + | 0.0011 |
| Sample 27 | 200 | 35.3 | + | + | 0.0011 |

Figure 4:
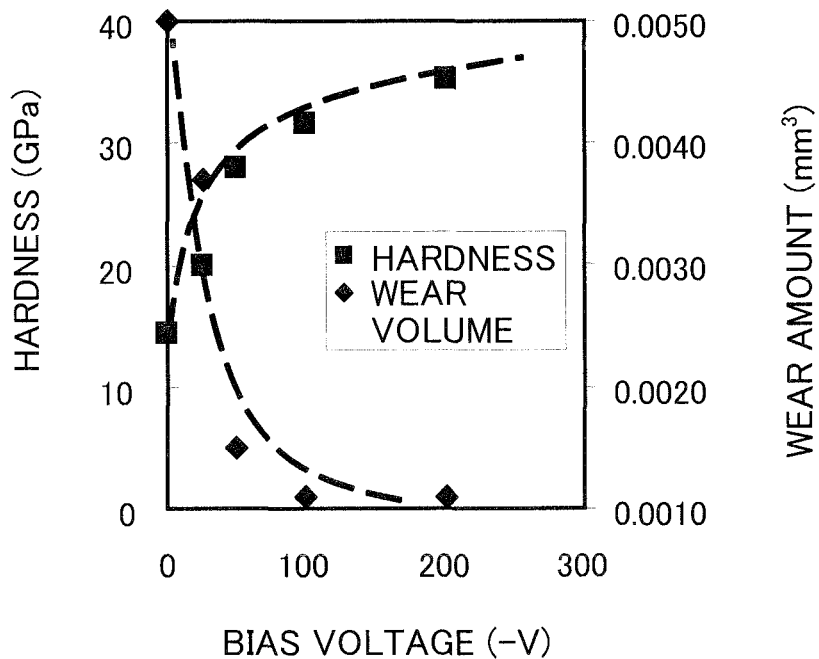
FIG. 4 is a diagram showing the relationship among the bias voltage applied to a substrate during film-formation of a diamond-like carbon layer with the sputtering method, the hardness and the wear resistance property of the diamond-like carbon layer.

As shown in Table 5 and FIG. 4, it is appreciated that as the bias voltage applied to the substrate during the film-formation of the DLC layer is higher, the hardness of the DLC layers becomes higher. In such a manner, it is possible to adjust the hardness of the DLC layers by adjusting the bias voltage applied when forming the DLO layers. Further, it is appreciated that as the hardness of the DLC layers becomes higher, the wear amount is reduced and the frictional wear resistance property is improved. As shown in table 5, it is appreciated that in Samples 13, and 27 in each of which the hardness of the high-hardness DLC layer was not less than 28 GPa, the evaluation result of the frictional wear resistance test was satisfactory (evaluation result: +). Accordingly, the hardness of the high-hardness DLC layer is preferably not less than 28 GPa. It is appreciated that, when the above hardness of the high-hardness DLC layer is represented by the ratio of the hardness of the high-hardness DLC layer to the hardness (14.3 GPa) of the low-hardness DLC layer, the hardness ratio is preferably not less than 1.9. Further, as explained above, the frictional wear resistance test in the embodiment was performed in oil under the assumption that each of Samples 1 to 29 (disks 10) was used in the fluid dynamic pressure bearing for the HDD. Therefore, a sliding film having a protective layer including the high-hardness DLC layer of which hardness is not less than 28 GPa exhibits satisfactory frictional wear resistance property and adhesion property in the presence of the FDB oil used in the hard disk drive application, and is suitable as a sliding member for a fluid dynamic pressure bearing apparatus for the spindle motor of the hard disk drive.

When comprehensively considering the evaluation results shown in Tables 1 to 5 and FIG. 4, it is further preferable that the high-hardness DLC layer has a hardness of not less than 28 GPa and that the ratio of the high-hardness DLC layer is 75% to 95%. As described above, it is appreciated that the protective film of the embodiment, regardless of having a simple structure, is capable of obtaining the satisfactory evaluation results both in the bending adhesion property and the frictional wear resistance property, by making the high-hardness DLC layer having a hardness in the specific range be included in the protective film at the specific ratio of the high-hardness DLC layer.

[Evaluation of Residual Stress]

Regarding each of Sample 7 (Comparative Example 1) and Samples 16, 17 and 20 prepared above, the residual stress of the protective film was obtained. The residual stress was obtained, with respect to each of Samples 7, 16, 17 and 20, based on the variation in the curvature before and after the film-formation using a thin glass substrate.

Figure 5:
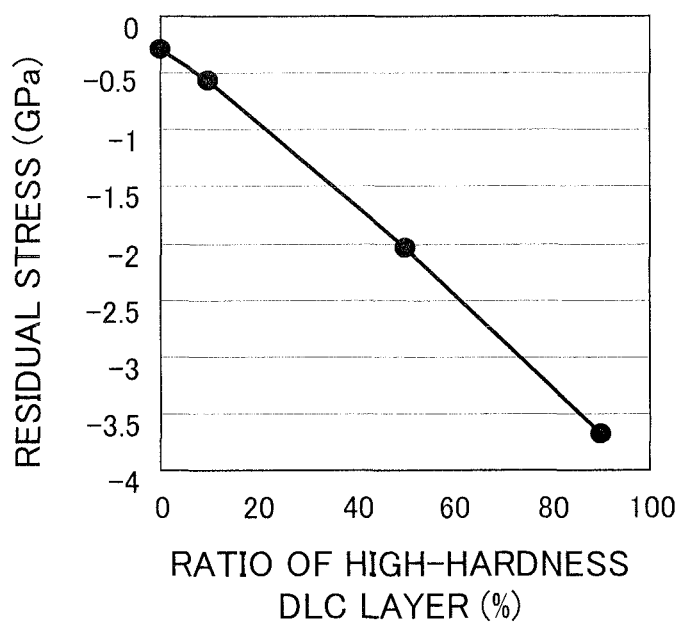
FIG. 5 is a diagram showing the relationship between the ratio (%) of thickness of high-hardness diamond-like carbon layer in relation to the total thickness of high and low-hardness diamond-like carbon layers in the protective film and the residual stress of the protective film.

As shown in FIG. 5, it is appreciated that as the ratio of the high-hardness DLC layer increases, the negative residual stress, i.e., the compressive stress becomes higher. A high residual stress means that the density of the protective film is high and that the hardness of the protective film is high. From FIG. 5, it is possible to verify that the protective film having the ratio of the high-hardness DLC layer within the range of 75% to 95%, which is preferred range in the embodiment, also has a high residual stress. Normally, a protective film having a high residual stress has a low adhesion property to the substrate. In the embodiment, however, the protective film exhibits the satisfactory adhesion property to the substrate even when the ratio of the high-hardness DLC layer is within the range of 75% to 95%, i.e., even when the high-hardness DLC layer has a high residual stress, as evidenced by the results shown in Tables 1 to 4 described above.

In the foregoing, the sliding member and the fluid dynamic pressure bearing apparatus of the present invention have been explained by the specific embodiments (examples). The present invention, however, is not limited to the specific embodiments (examples). It is possible to use a variety of materials as the substrate and the material for the base layer, without departing from the scope of the present invention.

The sliding member of the present invention has the protective film which has superior frictional wear resistance property and adhesion property to the substrate, regardless of having the simple structure. Accordingly, the sliding member of the present invention is suitable for a variety of kinds of fluid dynamic pressure bearing apparatuses. In particular, the sliding member of the present invention is suitable for a fluid dynamic pressure bearing apparatus for the spindle motor of the hard disk drive. The present invention is capable of providing, at a low cost, the fluid dynamic pressure bearing apparatus for the spindle motor of the hard disk drive, which has excellent durability.

What is claimed is:

1. A sliding member comprising:
a substrate; and
a protective film provided on the substrate, the protective film consisting of a metal base layer provided on the substrate, one low-hardness diamond-like carbon layer provided on the metal base layer, and one high-hardness diamond-like carbon layer provided directly on the low-hardness diamond-like carbon layer, wherein
the high-hardness diamond-like carbon layer has a homogenous structure within the high-hardness diamond-like carbon layer,
the low-hardness diamond-like carbon layer has a columnar structure in which a plurality of streaks extend in a thickness direction of the low-hardness diamond-like carbon layer, and
a hardness of the high-hardness diamond-like carbon layer is not less than 28 GPa, and a hardness of the low-hardness diamond-like carbon layer is not more than 17 GPa.

2. The sliding member according to claim 1, wherein a ratio of a thickness of the high-hardness diamond-like carbon layer with respect to a total of the thickness of the high-hardness diamond-like carbon layer and a thickness of the low-hardness diamond-like carbon layer is 75% to 95%.

3. The sliding member according to claim 1, wherein both of the high-hardness and low-hardness diamond-like carbon layers do not contain hydrogen.

4. The sliding member according to claim 1, which is a protective layer on a thrust bearing of a fluid dynamic pressure bearing apparatus.

5. The sliding member according to claim 4, wherein a groove, along which a fluid used in the fluid dynamic pressure bearing apparatus flows, is formed on a surface of the substrate; and
the protective film is formed in the groove.

6. The sliding member according to claim 1, which is a protective layer formed on a bearing sleeve of a fluid dynamic pressure bearing apparatus.

7. A fluid dynamic pressure bearing apparatus comprising the sliding member as defined in claim 1.

8. A spindle motor apparatus of a hard disk drive comprising the fluid dynamic pressure bearing according to claim 7.

9. A sliding member, comprising:
a substrate; and
a protective film provided on the substrate, the protective film consisting of a metal base layer, a first diamond-like carbon layer which has a columnar structure in which a plurality of streaks extend in a thickness direction of the first diamond-like carbon layer and which is formed on the metal base layer, and a second diamond-like carbon layer which has a homogeneous structure and which is formed on the first diamond-like carbon layer.

10. The sliding member according to claim 9, wherein a ratio of a thickness of the second diamond-like carbon layer with respect to total of the thickness of the second diamond-like carbon layer and a thickness of the first diamond-like carbon layer is 75% to 95%.

11. The sliding member according to claim 9, wherein both of the first and second diamond-like carbon layers do not contain hydrogen.

12. The sliding member according to claim 9, which is a protective layer formed on a bearing sleeve of a fluid dynamic pressure bearing apparatus.

13. The sliding member according to claim 9, which is a protective layer formed on a thrust bearing of a fluid dynamic pressure bearing apparatus.

14. A fluid dynamic pressure bearing apparatus comprising the sliding member as defined in claim 9.

15. A spindle motor apparatus of a hard disk drive comprising the fluid dynamic pressure bearing according to claim 14.

* * * * *